July 10, 1962

J. K. FLOYD 3,044,023

TRANSISTOR INVERTER-BATTERY CHARGER

Filed July 1, 1959

INVENTOR.
JAMES KERMIT FLOYD
BY
*Robert J. Stephens*
ATTORNEY

July 10, 1962          J. K. FLOYD          3,044,023

TRANSISTOR INVERTER-BATTERY CHARGER

Filed July 1, 1959          2 Sheets-Sheet 2

*INVENTOR.*
JAMES KERMIT FLOYD
BY
Robert I. Staples
*ATTORNEY*

United States Patent Office 3,044,023
Patented July 10, 1962

3,044,023
TRANSISTOR INVERTER-BATTERY CHARGER
James Kermit Floyd, Euclid, Ohio, assignor to The Electric Storage Battery Company, a corporation of New Jersey
Filed July 1, 1959, Ser. No. 824,400
5 Claims. (Cl. 331—59)

The present invention relates to a circuit for converting the output of an electric battery into an alternating current and to a circuit for charging a battery. More specifically, the present invention is concerned with an electrical inverter of the type in which a saturable core transformer is utilized to cause circuit oscillation.

A reliable and efficient means for converting the output of a storage battery into an alternating current having a standard frequency and voltage has long been sought as a source of portable power for use where alternating current is unavailable and for emergency purposes in the event of a power failure. Until the advent of the transistor and more specifically, the saturable core type transistor inverter, reliable and economical means for accomplishing the conversion of the output of a battery to an alternating current signal were unavailable. Still further, none of the prior art inverting devices were operable to recharge a battery once it had been discharged or maintain the battery at full charge without the use of auxiliary equipment.

It is, accordingly, an object of the present invention to provide a transistor saturable core inverter which is operable to supply a well-regulated, frequency-stable alternating current from a rechargeable battery and which is adapted to recharge the battery and maintain the battery in fully charged condition when it is connected to a suitable source of alternating current.

Saturable core inverter circuits are well known in the art and are generally of two types. One type is that shown in the Bright et al. Patent No. 2,783,384, in which the output transformer saturates and the other type is best exemplified in the Jensen Patent No. 2,774,878, in which a small feedback transformer is saturated. Of these two types, the latter has several advantages, namely, less power is lost in the saturation of a necessarily large output transformer and the circuit requires a less expensive saturable core transformer. Both types of saturable core inverters have limitations when utilized to supply alternating currents of substantial magnitudes. One of the most serious of these limitations is that as the current supplied to the load increases, the transistor control voltage decreases and as a result of the frequency of the output voltage increases often to a degree that becomes unuseable. In addition, the output of this type of circuit is a square wave, and when a square wave is applied to an inductive load, such as a motor, the voltage generated in the load as a result of abrupt changes in signal polarity is fed back through the output transformer to the transistors and generally far exceeds the peak inverse voltage rating of the transistors employed. As a result of these limitations, the power capabilities of such inverters are generally severely limited.

It is, therefore, another object of the present invention to provide a saturable core transistor inverter circuit in which the frequency of the circuit output is independent of the load current.

A further object of the present invention is to provide means in a saturable core transistor inverter circuit for protecting the transistor from the inverse voltage applied across their outputs by the voltages generated in an inductive load and to utilize this voltage to charge the battery supplying the inverter with current.

The various objects of the present invention are achieved in a circuit which employs a pair of transistors having their output electrodes connected in push-pull through a battery to a center-tapped primary winding on an output transformer. The transistors are operated as a pair of switches under the control of a saturable core feedback transformer having its secondary winding connected to their input electrodes and its primary winding coupled to a feedback winding on the output transformer. To stabilize the output frequency, a signal proportional to the load current is fed back to the input circuit of the transistors. A unidirectional current path is connected in shunt across the output electrodes of the transistors to bypass the signals applied across the transistors' output circuits when the output of the inverter is applied to an inductive load. Switching means are also provided to adapt the circuit for battery charging operation. When so adapted, the transistors are utilized as control diodes connected in a full-wave center-tapped bridge circuit with the secondary winding of the output transformer adapted to be connected to a source of alternating current. To automatically control the rate of battery charging, the transistors are isolated from the feedback circuit utilized for controlling inverter operation, and a pair of resistors are connected across their input circuits to control the emitter-base voltage and hence the charging rate.

A better understanding of the present invention may be had from the following description when read with reference to the accompanying drawings of which:

Figure 1:
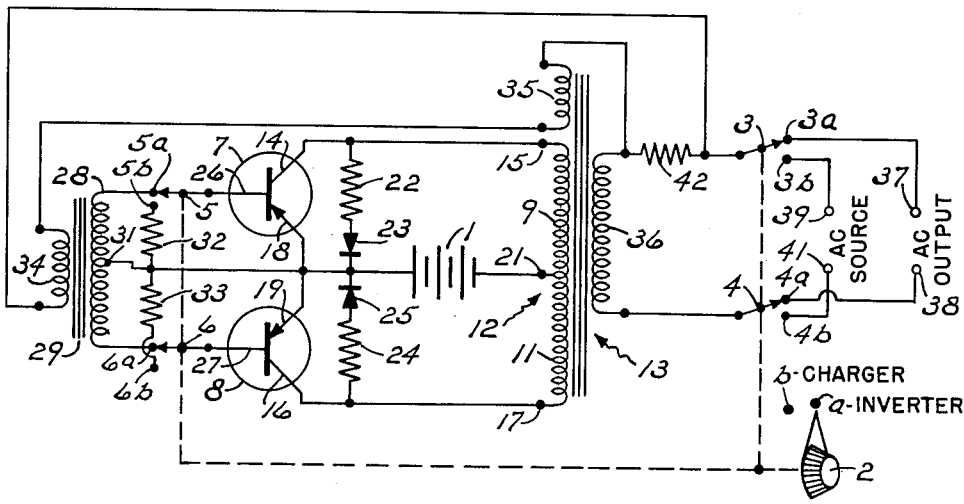
FIG. 1 is a circuit diagram of an embodiment of the present invention.

Referring now to FIG. 1, there is shown a circuit diagram of one embodiment of the inverter-charger of the present invention which is adapted to convert the output of the battery 1 into an alternating current and also to charge the battery 1. The conversion of this circuit from an inverter to a charger is affected by means of a two-position, four-pole gang switch 2 having four movable contacts 3, 4, 5, and 6, each associated with a pair of stationary contacts 3a, 3b, 4a, 4b and so on. As shown, each of the movable contacts of the switch 2 is in the "a" position which connects the circuit for inverter operation. When the switch 2 is in the "b" position, the circuit is operable to charge the battery 1.

The circuit employs a pair of transistors 7 and 8, each having an emitter, collector and base. The transistors 7 and 8 have their output electrodes connected in push-pull across the sections 9 and 11 respectively of a center-tapped winding 12 of an output transformer 13. To this end, the collector 14 of the transistor 7 is connected to the end terminal 15 of the secondary winding section 9 and similarly, the collector 16 of the transistor 8 is connected to the end terminal 17 of the secondary winding section 11. The emitter 18 of the transistor 7 and the emitter 19 of the transistor 8 are connected together and to the positive terminal of the battery 1. The negative terminal of the battery 1 is connected to the center-tapped terminal 21 of the secondary winding 12. A resistor 22 and a diode 23 are connected in shunt across the output circuit of the transistor 7 and similarly, a resistor 24 and a diode 25 are connected in shunt across the output circuit of the transistor 8. As shown, the diodes 23 and 25 are poled so that their low impedance path is in the direction of the inverse transistor current flow.

The base 26 of the transistor 7 is connected through the movable switch contact 5 and the stationary contact 5a to one end terminal of a center-tapped secondary winding 28 of a feedback transformer 29. Similarly, the base 27 of the transistor 8 is connected through the movable switch contact 6 and stationary contact 6a to the other end terminal of the center-tapped secondary winding 28. The center-tapped 31 of the secondary winding 28 is connected to the emitters 18 and 19 of the transistors 26 and 27 respectively. As shown, the emitter 18 of the transistor 26 is also connected through a resistor 32 to the stationary contact 5b and similarly, the emitter 19 of the transistor 8 is connected through a resistor 33 to the stationary switch contact 6b. As will be explained in more detail hereinafter, the resistors 32 and 33 are operative to control the rate of the charging of the battery 1 when the inverter of the present invention is utilized as a battery charger.

The feedback transformer 29 has a primary winding 34 which is coupled to a feedback winding 35 on the output transformer 13. The output transformer 13 has an output winding 36 which is adapted to be coupled to either a pair of output terminals 37 and 38 which are adapted to be connected to a load when the circuit is operated as an inverter or to a pair of input terminals 39 and 41 which are adapted to be connected to a source of alternating current when the circuit is operated as a battery charger. The connections just described are affected by means of the movable switch contacts 3 and 4 which are operable to connect the output winding 36 of the output transformer 13 either to the stationary contacts 3a and 4a which are connected to the terminals 37 and 38 respectively or to the contacts 3b and 4b which are connected to the terminals 39 and 41 respectively. As shown, a resistor 42 is connected in series between the output winding 36 and the switch contact 3. Accordingly, the resistor 42 is in series with a load connected to the inverter circuit. As shown, the resistor 42 is connected in series between the feedback winding 35 of the transformer 13 and the primary winding 34 of the feedback transformer 39.

In considering the operation of the circuit of FIG. 1 as an inverter, it will be assumed that the transistor 7 has a greater leakage current through its emitter-collector circuit than the transistor 8. Thus, a greater current will flow from the positive terminal of the battery 1 through the emitter-collector circuit of the transistor 7 and section 9 of the secondary winding 12 of the transformer 13 to the negative terminal of the battery 1 than through the emitter-collector circuit of the transistor 8 and section 11 of the secondary winding 12. The predominating flow of current through the secondary winding section 9 will induce a voltage in the feedback winding 35 which will cause a current flow through the primary winding 34 of the feedback transformer 29. This current flow in turn induces the voltage across the secondary winding 28 of the transformer 29. The windings 34 and 28 of the transformer 29 are so arranged that the polarity of the signal impressed under these conditions between the emitter and base of the transistor 7 are such as to make the base 26 more negative than the emitter 18 and the polarity of the signal impressed across the emitter and base of the transistor 8 are such as to make the base 27 more positive than the emitter 19. The transistor 7 is thus made still more conductive and the transistor 8 is made less conductive. Accordingly, more current will flow through the output circuit of the transistor 7 and hence, the secondary winding section 9 of the secondary winding 12 and less current will flow through the output circuit of the transistor 8 and the section 11 of the primary winding 12. This results in the full conduction of the transistor 7 and the complete cut-off of the transistor 8. As this condition prevails, a voltage proportional to the voltage of the battery 1 will be induced in the winding 36 of the transformer 13.

Operation with the transistor 7 conducting and the transistor 8 cut off continues until such time that the core of the transformer 29 becomes saturated due to the voltage impressed across its primary winding 34 from the feedback winding 35. When the core of the transformer 29 becomes saturated, the driving signal across the emitter base circuit of the transistor 7 is reduced and the current flow through the output circuit of the transistor 7 is likewise reduced. Simultaneously, the flux change in the core of the transformer 29 as a result of saturation is such as to now cause a voltage of the opposite polarity to be produced in its windings. This change in polarity turns the transistor 7 off and starts the conduction of the transistor 8. The current flow from the battery 1 is now predominantly through the output circuit of the transistor 8 and the secondary winding section 11 of the winding 12 and as a result of the feedback described before, the transistor 8 is made fully conductive and the transistor 7 is cut completely off. Under this condition, a voltage of the opposite polarity that existed during the conduction of the transistor 7 is induced in the output winding 36 of the transformer 13. This state now continues until the core of the transformer 29 saturates in the reverse direction whereupon the initial state again prevails and the cycle repeats. In this manner, a square wave alternating current signal is produced across the output terminals 37 and 38 of the circuit.

When the current supplied to a load from the winding 36 of the transformer 13 is increased, the voltage feedback from the winding 35 to the feedback transformer 34 decreases, and as a result, the frequency of circuit operation increases. Accordingly, the feedback winding 35 of the transformer 13 and the primary winding 34 of the transformer 14 are connected in series with a resistor 42 which is in series with the output winding 36. When so connected, the voltage drop produced across the resistor 42, which is proportional to the load current, is fed back to the primary winding 34 in addition to the voltage induced in the feedback winding 35. By properly proportioning the magnitude of the resistor 42, the voltage drop across the resistor 42 can be made such as to maintain the output frequency of circuit substantially constant over almost the entire range of circuit operation.

When the square wave output of the inverter is applied to an inductive load, a voltage is induced in the center-tapped winding 12 of the transformer 3 as a result of the abrupt changes in the polarity of the output signal. This voltage, which can far exceed the peak inverse voltage ratings of the transistor, is applied across the output circuits of the transistors. The diodes 23 and 25 are connected across the output circuits of the transistors 7 and 8 to provide a low impedance path in the direction of this induced voltage to protect the transistors damage. It should be noted that, in addition to protecting the transistors 7 and 8, they permit the utilization of this induced voltage for the charging of battery 1. In this manner, the voltage induced back into the circuit from an inductive load is dissipated in the recharging of the battery 1 instead of being dissipating in the form of heat elsewhere in the circuit. In this respect, the resistors 22 and 24, connected in series with the diodes 23 and 25, are chosen to be of such a value that when the circuit is utilized as a battery charger, the transistors 7 and 8 rectify a major portion of the charging current.

When the switch 2 is in the "b" position, the circuit of FIG. 1 is a battery charger. In this position, the movable contacts 3 and 4 connect the output winding 36 of the transformer 13 to the terminals 39 and 41 which are adapted to be connected to a source of alternating current for charging the battery 1. The movable contacts 5 and 6 simultaneously disconnect the input circuits of the transistors 7 and 8 from the secondary winding 28 of the feedback transformer 29 and connect the resistors 32 and 33 across the input circuits of the transistors 7 and 8 respectively. When utilized as a charger, the transistors 7 and 8 function as controlled diodes in a full-wave center-tapped bridge with the output winding 36 of the output transformer 31 acting as a transformer primary and the center-tapped winding 12 acting as a transformer secondary. As a result of resistors 32 and 33, the circuit operates as a substantially constant voltage charging source. As the voltage builds up in the battery, the signal on the bases of the transistors becomes less negative and they are rendered less conductive. When the battery is in a fully-charged condition, the charging rate is maintained on what could be termed as a "trickle charge." For example, if a 12-volt automobile battery had a terminal voltage of 8 volts, due to its state of discharge, the charging rate would be about 10 amperes, whereas the charging rate will taper to about 0.045 ampere when the terminal voltage of the battery reaches 12.6 volts. As will be understood by those skilled in the art, Zener diodes may be substituted for the resistors 32 and 33 to achieve a more accurately controlled constant voltage charge. Because the circuit of the present invention can be utilized as either an inverter or a charger, it makes an ideal source of standby power. When so used, the battery can be maintained in a fully charged condition by connecting the terminals 39 and 41 to a source of standard alternating current and upon the failure of said source of current, the inverter can provide standby power of the same voltage and frequency as this source.

By way of illustration and example, typical values for the components of the embodiment of the present invention shown in FIG. 1 for an inverter having a 350 watt output when operated from a standard 12-volt automobile battery might be as follows:

Transistors 7 and 8 _____ 2 Delco 2N441 (paralleled).
Transformer 13:
    Winding sections 9 and 11 _____ 22 turns.
    Winding 35 _____ 8 turns.
    Winding 36 _____ 220 turns.
Transformer 29:
    Core-saturable (square hysteresis loop).
    Winding 34 _____ 44 turns.
    Winding 28 _____ 88 turns.
    (Center-tapped.)
Resistors 22 and 24_____ 30 ohms.
Diodes 23 and 25_____
Resistors 32 and 33_____ 30 ohms.
Resistor 42_____ 1 to 2 ohms.

Figure 2:
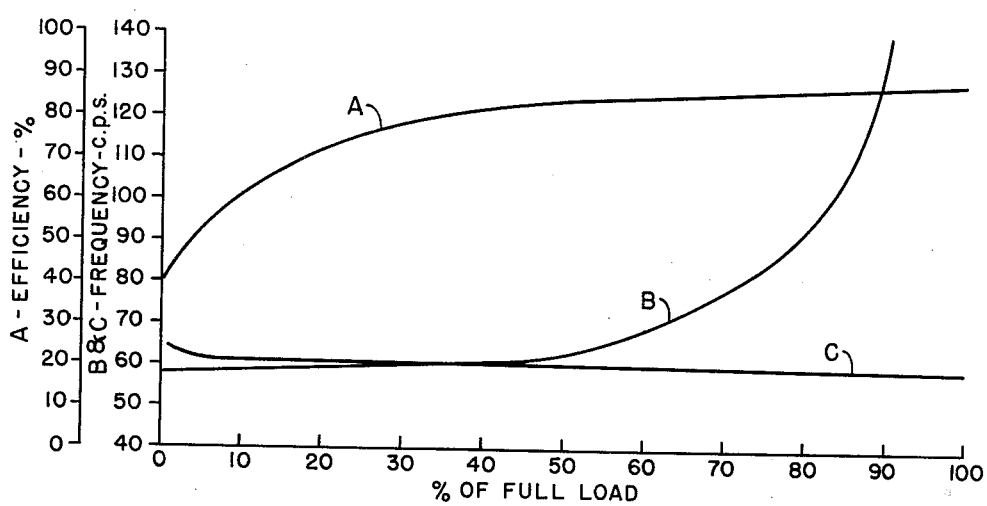
FIG. 2 is a graph illustrating the performance of the circuit of FIG. 1 under various operation conditions.

Referring now to FIG. 2, there is shown a graph illustrating the performance of an inverter made in accordance with the teachings of the present invention and utilizing the components listed above. Curve A illustrates the efficiency of the inverter for various conditions of load. As can be seen, the circuit has an efficiency of better than 80% when operating above 35% of full load and an efficiency approaching 90% when it is operated above 70% of full load. Curves B and C show the inverter output frequency as a function of inverter load with curve B showing the frequency characteristics of the circuit when the resistor 42 is not connected in the feedback loop and curve C, showing the frequency characteristics when the resistor 42 is connected in the feedback loop. As can be seen, without the addition of feedback proportional to load current, the inverter frequency increases rapidly as the load on the circuit increases. This increase in frequency of the inverter operation is due to the tendency of the system to attempt to maintain a constant flux density in the core of the saturable transformer as the current gain of the transistors decreases with increased current flow and the transistor driving signal decreases as the loading on the output transformer increases. Under some circumstances, the frequency of inverter operation can go so high as to approach the limit at which the transistors can be switched which results in a distorted wave form and a marked increased in power dissipated in the transistors. As a result of the characteristic, the useful range of circuit output is extremely limited. With the addition of a small amount of feedback proportional to load current as illustrated by curve C, it can be seen that the frequency of the inverter output is substantially constant over almost the entire range of load conditions.

Figure 3:
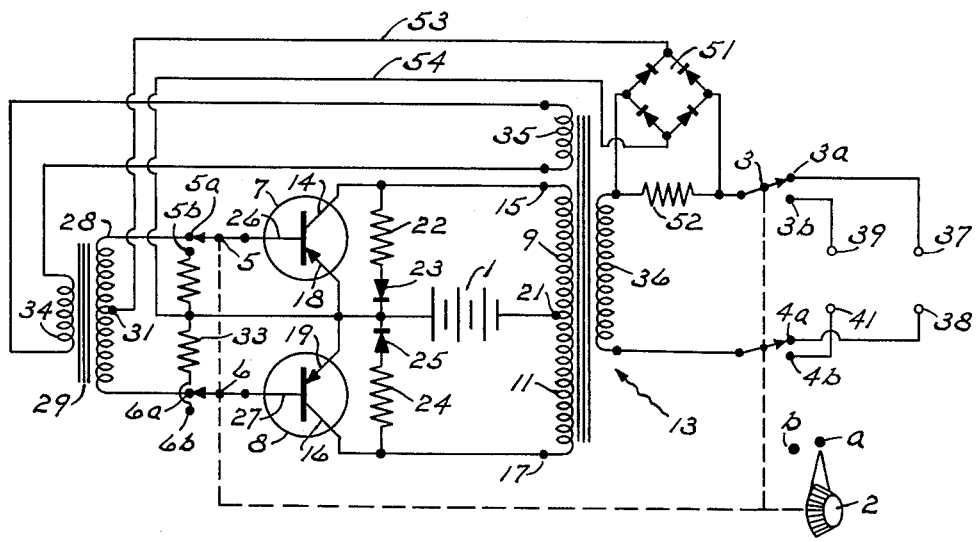
FIG. 3 is a circuit diagram of another embodiment of the present invention.

Referring now to FIG. 3, there is shown a modification of the present invention in which D.C. feedback proportional to load is employed to stabilize the frequency of the inverter. Similar reference characters have been employed to designate components similar to those used in the embodiment of the present invention shown in FIG. 1. The basic operation of the inverter's circuit in FIG. 3 is identical with the circuit of FIG. 1, which has been explained herein before, and accordingly, a detailed description of the construction of corresponding parts of the present circuit and their operation will not be repeated.

As shown, in this embodiment of the present invention, the feedback winding 35 of the output transformer 13 is connected directly to the primary winding 34 on the feedback transformer 29. To stabilize the frequency of inverter operation, a signal proportional to load current, is rectified by means of a rectifier bridge 51 and fed back to the input of the transistors 7 and 8. The bridge rectifier 51 has its input winding connected across the resistor 52 connected in series with the output winding 36 of the transformer 13. The output of the bridge rectifier 51 is connected, by means of conductors 53 and 54 to the emitter-base circuits of the transistors 7 and 8. As shown, the conductor 53 is connected to the base 26 of the transistor 7 and the base 27 of the transistor 8 through the center-tapped secondary winding 28 of the output transformer 29 and the conductor 54 is connected directly to the emitters 18 and 19 of the transistors 7 and 8.

The operation of the circuit of FIG. 3 differs from the operation of the circuit of FIG. 1 only to the extent that the direct current feedback is utilized to stabilize the inverter's frequency instead of alternating current. In operation, the D.C. signal fed back from the bridge rectifier 51 controls the D.C. base current in accordance with variations in inverter load current. The use of direct current has the advantage of permitting high transistor base currents without a proportional increase in the size of the feedback transformer 29. If the inverter of the present invention is utilized as a so-called "D.C. to D.C." inverter, it is obvious that additional rectifying means would not have to be employed to provide a D.C. signal proportional to load current.

From the foregoing explanation of the inverter-charger of the present invention, it can be seen that there has been achieved a means for providing a substantially constant frequency, alternating-current signal from a direct current source such as a battery. Still further, this desirable result has been achieved by the use of circuitry which is readily adapted to recharging a battery and thus providing a practical portable power source for use where alternating current is unavailable as well as for emergency purposes in the event of a power failure.

Having described the present invention, what is claimed is:

1. A transistor inverter for converting a direct current to an alternating current comprising a pair of transistors each having an input circuit and an output circuit, a source of direct current, a first transformer having a feedback winding, a center-tapped winding and an output winding adapted to be connected to a load, said transistors having their output circuits connected in push-pull relationship through said direct current source to said center-tapped winding on said first transformer, a pair of diodes, each of said diodes being connected across the output circuit of separate ones of said transistors and poled to provide a low impedance path in the inverse direction of transistor current flow, a second transformer having a primary winding coupled to the feedback winding on said first transformer and a center-tapped secondary winding connected to the input circuits of said transistors, said second transformer being adapted to saturate before said first transformer, and a resistor connected to the output winding of said first transformer, said resistor being connected in series with the feedback winding on said first transformer and the primary winding of said second transformer.

2. A transistor inverter adapted to supply an alternating current to an inductive load comprising a pair of transistors each having an input circuit and an output circuit, a rechargeable battery, a first transformer having a feedback winding, a center-tapped winding and an output winding adapted to be connected to an inductive load, said transistors having their output circuits connected in push-pull relationship through said battery to said center-tapped winding on said first transformer, a pair of diodes each of said diodes being connected across the output circuit of separate ones of said transistors and poled to provide a low impedance path in the inverse direction of transistor current flow, a second transformer having a primary winding coupled to the feedback winding on said first transformer and a center-tappend secondary winding connected to the input circuits of said transistors, said second transformer being adapted to saturate before said first transformer and control the conduction of said transistors, and means connected in series with said output winding and the input circuit of said transistors to maintain the frequency of the conduction of said transistors substantially constant.

3. An inverter-charger comprising, in combination, a first transformer having a first winding, a center-tapped second winding and a third winding, a pair of transistors each having an input circuit and an output circuit, a rechargeable electric battery, said transistors having their output circuits connected in push-pull relationship through said battery to said center-tapped second winding, a first pair of terminals adapted to be connected to a load, a second pair of terminals adapted to be connected to a source of alternating current for charging said battery, first switching means adapted in one position to connect said third winding to said first terminals and in a second position to connect said first winding to said second terminal, a second transformer having a saturable core, a first winding and a center-tapped second winding, a pair of resistors, second switching means operative in one position to connect the input circuits of said transistors to said second center-tapped winding of said second transformer and in another position to connect said pair of resistors across the input circuits of said transistors, said first and second switching means being ganged so that when said first switching means are connected to said first pair of terminals the input circuits of said transistors are connected to said center-tapped second winding of said second transformer, said first winding on said second transformer being connected to said third winding on said first transformer, and a resistor connected in series with said third winding of said first transformer and in series with said first winding of said second transformer to maintain the current in said first winding of said second transformer independent of the current supplied to said load.

4. An inverter-charger comprising, in combination, a first transformer having a first winding, a center-tapped second winding and a third winding, a pair of transistors each having an input circuit and an output circuit, a rechargeable electric battery, said transistors having their output circuits connected in push-pull relationship through said battery to said center-tapped second winding of said first transformer, a pair of diodes, each of said diodes being connected across the output circuit of separate ones of said transistors and poled to provide a low impedance path in the inverse direction of transistor current flow, a second transformer having a saturable core, a first winding and a center-tapped second winding, a first pair of terminals adapted to be connected to a load, a second pair of terminals adapted to be connected to a source of alternating current to charge said battery, a pair of resistors, switching means adapted in one position to connect the third winding of said first transformer to said first pair of terminals and the input circuits of said transistors to said center-tapped second winding of said second transformer and in a second position to connect the third winding of said first transformer to said second pair of terminals and said pair of resistors across the input circuits of said transistors, said second winding on said second transformer being connected to said third winding on said first transformer and means for applying feedback proportional to load current to the input circuits of said transistors to maintain the frequency of inverter oscillation constant, said feedback being applied in series with the signal applied from said first winding on said first transformer.

5. A transistor inverter comprising a pair of transistors each having an input circuit and an output circuit, a source of direct current, a first transformer having a first winding, a center-tapped second winding and a third output winding, said transistors having their output circuits connected in push-pull relationship through said direct current source to said second center-tapped winding on said first transformer, a second transformer having a primary winding coupled to the first winding on said first transformer and a center-tapped secondary winding connected to the input circuits of said transistors, said second transformer being adapted to saturate before said first transformer, and means for applying feedback proportional to load current to the input circuits of said transistors to maintain the frequency of inverter oscillation constant, said feedback proportional to load current being an alternating current applied to the primary winding of said second transformer, said feedback being applied in series with the signal applied from said first winding on said first transformer.

References Cited in the file of this patent
UNITED STATES PATENTS

| | | |
|---|---|---|
| 2,748,274 | Pearlman | May 29, 1956 |
| 2,774,878 | Jensen | Dec. 18, 1956 |
| 2,848,614 | Lyons | Aug. 19, 1958 |
| 2,950,446 | Humez et al. | Aug. 23, 1960 |